Patented Aug. 10, 1954

2,686,197

UNITED STATES PATENT OFFICE 2,686,197

O-(2,4,5-TRICHLOROPHENYL) METHANE-PHOSPHONIC CHLORIDE

Henry Tolkmith, Midland, Mich., assignor to The Dow Chemical Company, Midland, Mich., a corporation of Delaware No Drawing. Application February 8, 1954, Serial No. 409,059

1 Claim. (Cl. 260—461)

The present invention is directed to O-(2,4,5-trichlorophenyl) methanephosphonic chloride of the formula

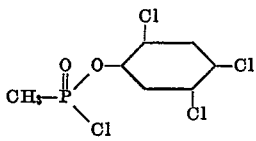

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting one molecular proportion of 2,4,5-trichlorophenol with at least one molecular proportion of methanephosphonic dichloride of the formula

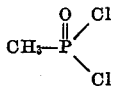

in an inert organic solvent such as diethyl ether or benzene. The reaction is carried out in the presence of a hydrogen chloride acceptor such as pyridine.

In carrying out the reaction, the 2,4,5-trichlorophenol and hydrogen chloride acceptor are dispersed in the solvent and the resulting mixture added portionwise with stirring to the methanephosphonic dichloride dispersed in the same solvent. The mixture is thereafter heated for a period of time at a temperature of from 30° to 80° C. to complete the reaction. The reaction takes place smoothly at the temperature range of from 20° to 80° C. and at a rate which varies directly with the employed temperature. The reaction is somewhat exothermic, temperature being controlled by regulation of the rate of contacting the reactants as well as by the addition and subtraction of heat, if required. Upon completion of the reaction, the mixture may be filtered and the filtrate distilled under reduced pressure at gradually increasing temperatures to separate low boiling constituents and to obtain as a residue the desired O-(2,4,5-trichlorophenyl) methanephosphonic chloride. Distillation temperatures substantially in excess of 150° C. for any appreciable period of time should not be employed as the desired product has a tendency to decompose at such temperature.

In a representative preparation, 108.5 grams (0.55 mole) of 2,4,5-trichlorophenol and 48 grams (0.595 mole) of pyridine were dispersed in 680 milliliters of diethyl ether and the resulting mixture added portionwise with stirring to 219 grams (1.65 moles) of methanephosphonic dichloride (boiling at 163° C. at atmospheric pressure) dispersed in 170 milliliters of diethyl ether. The mixture was thereafter heated for one hour at the boiling temperature and under reflux to complete the reaction. At the end of this period, the mixture was filtered and the filtrate concentrated by distillation under reduced pressure to a temperature up to 130° C. to obtain as a residue an O-(2,4,5-trichlorophenyl) methanephosphonic chloride product. The latter is a viscous oil having a density of 1.5820 at 20° C.

The new O-(2,4,5-trichlorophenyl) methanephosphonic chloride product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic phosphonic chloride.

This is a continuation-in-part of my copending application Serial No. 203,757, filed December 30, 1950, now abandoned.

I claim:

O-(2,4,5-trichlorophenyl) methanephosphonic chloride.

No references cited